(12) United States Patent
Shibata et al.

(10) Patent No.: US 6,388,021 B1
(45) Date of Patent: *May 14, 2002

(54) ACRYLIC METAL SURFACE TREATMENT COMPOSITION WITH HYDROXY AND AMINO/AMMONIUM FUNCTIONALITY

(75) Inventors: Yasuhiro Shibata, Yokohama; Tomoyuki Kanda, Kamakura; Atsuhiko Tounaka, Yokohama; Susumu Maekawa, Yamato; Kiyotada Yasuhara, Kashiwa, all of (JP)

(73) Assignee: Nippon Paint Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,192

(22) Filed: Apr. 14, 1999

Related U.S. Application Data

(63) Continuation of application No. PCT/JP97/03656, filed on Oct. 13, 1997.

(30) Foreign Application Priority Data

Oct. 21, 1996 (JP) .............................................. 8-278366
Sep. 30, 1997 (JP) .............................................. 9-265552

(51) Int. Cl.⁷ ............................ C08F 16/00; B32B 5/16; B32B 15/08
(52) U.S. Cl. ............................... 525/328.2; 525/328.4; 428/328; 428/461; 428/463
(58) Field of Search .......................... 525/328.4, 328.2, 525/328.8; 428/463, 461, 328

(56) References Cited

U.S. PATENT DOCUMENTS

| | | | | | |
|---|---|---|---|---|---|
| 3,886,125 A | * | 5/1975 | Chromecek | .......... | 260/78.3 UA |
| 4,160,756 A | * | 7/1979 | Nishida et al. | ........ | 260/29.6 M |
| 4,170,671 A | * | 10/1979 | Hirasawa et al. | ....... | 427/388 C |
| 4,183,772 A | * | 1/1980 | Davis | ........................ | 148/6.16 |
| 4,313,769 A | | 2/1982 | Frelin et al. | ................ | 148/6.27 |
| 4,314,044 A | * | 2/1982 | Hughes et al. | ......... | 260/29.6 M |
| 4,335,829 A | | 6/1982 | Christenson et al. | ....... | 220/458 |
| 4,637,839 A | | 1/1987 | Hall | ........................... | 148/6.2 |
| 5,039,360 A | * | 8/1991 | Brugarolas | .................. | 148/251 |
| 5,895,532 A | * | 4/1999 | Nakamura et al. | .......... | 148/247 |

FOREIGN PATENT DOCUMENTS

| | | |
|---|---|---|
| EP | 0 200 546 A1 | 11/1986 |
| EP | 0 208 367 A1 | 1/1987 |
| EP | 0448746 | 10/1991 |
| JP | 51-73938 | 6/1976 |
| JP | 59232191 A | 12/1984 |
| JP | 63171683 A | 12/1986 |
| JP | 63171684 A | 12/1986 |
| JP | 03281672 A | 12/1991 |
| JP | 5-117869 | 5/1993 |
| JP | 06146002 A | 5/1994 |

OTHER PUBLICATIONS

Abstract of Japanese Patent Pub No. 61264040, vol. 11, No. 124, (1986), Feb. 13, 2002.

* cited by examiner

Primary Examiner—Blaine Copenheaver
Assistant Examiner—Kevin Kruer
(74) Attorney, Agent, or Firm—Oliff & Berridge, PLC

(57) ABSTRACT

A metal surface treatment composition is provided which improves corrosion resistance and film adhesion, and confers slip properties. This composition is an acrylic resin-containing metal surface treatment composition which is water-soluble, water-dispersible or emulsifiable, which comprises an acrylic resin, this resin comprising either or both of an amino group and an ammonium group together with a hydroxyl group and a hydrophobic group, and which further comprises a heavy metal or one of its salts.

25 Claims, No Drawings

ACRYLIC METAL SURFACE TREATMENT COMPOSITION WITH HYDROXY AND AMINO/AMMONIUM FUNCTIONALITY

This application is a continuation of PCT/JP97/03656, filed Oct. 13, 1997.

FIELD OF THE INVENTION

This invention relates to an acrylic resin-containing metal surface treatment composition, treatment method and treated metal material, and in particular to an acrylic resin-containing metal surface treatment composition, treatment method and treated metal material giving improved corrosion resistance, film adhesion and slip properties (referred to also as "lubricity").

BACKGROUND OF THE INVENTION

Conventionally, phosphate treatment, chromate treatment and non-chromate treatment, etc. were performed as surface treatments for food cans, car bodies, coil coatings for steel plate and metals for construction materials. For example, a phosphate film is formed on a metal surface as a pretreatment when organic coatings such as paints and adhesives are applied to metal surfaces such as iron, zinc, and aluminum. By subsequently applying an organic film such as a coating, corrosion resistance and film adhesion can be improved. However, conventional phosphate treatment did not necessarily provide sufficient corrosion resistance, film adhesion or slip properties to satisfy demand in recent years.

To improve corrosion resistance following phosphate treatment, it was common to apply a coating after first applying a primer coat. However, if a primer was first applied, although corrosion resistance and film adhesion improved, the number of coating steps increased, complicating the procedure and leading to higher cost.

"A Metal Surface Treatment for Composite Films" of Japanese Patent Laid-open publication No. Hei 5-117869 was proposed for example as a metal surface treatment which aims to omit the primer coating while giving highly developed corrosion resistance and film adhesion. The metal surface treatment of the aforesaid Japanese Patent Laid-open publication No. Hei 5-117869 is a phosphate surface treatment liquid comprising a cationic organic polymer compound or one of its salts having one or more cationic nitrogen atoms, and a molecular weight in the range of 1,000–1,000,000.

In the "Surface Treatment Method for Aluminum and Aluminum Alloys" described in Japanese Laid-open publication No. Sho 51-73938, the metal to be treated is limited to aluminum. This method aims to confer corrosion resistance and film adhesion properties. It is described that this metal surface treatment method uses a liquid of which the principal components are water-soluble resins such as vinyl acetate, vinylidene chloride and acrylic acid or organic polymer film forming substances comprising emulsion resins, and a water-soluble titanium compound.

However, although they offer improved corrosion resistance and film adhesion compared with the prior art, neither the aforesaid metal surface treatment agent nor treatment method has reached recent demand requirements. In particular, in the manufacture of food cans using aluminum or its alloys, they do not prevent jamming, and in the coil coating of steel plate, lubricity is poor.

DISCLOSURE OF THE INVENTION

It is therefore an object of this invention to provide an acrylic resin-containing metal surface treatment composition, treatment method and treated metal material offering improved corrosion resistance, film adhesion and slip properties.

To achieve this object, the acrylic resin-containing metal surface treatment composition according to this invention comprise:

a) a water-soluble, water-dispersible or emulsifiable acrylic resin comprising either an amino group or an ammonium group, or both, together with a hydroxyl group and hydrophobic group, and b) a heavy metal or one of its salts.

As permeability is suppressed by an inorganic film which comprises a heavy metal or one of its salts, corrosion resistance improves. Further, as the amino group or ammonium group in the acrylic resin is coordinated with the (heavy) metal, the aforesaid inorganic film is connected via the acrylic resin. This prevents cohesive failure of the inorganic film, giving an almost uniform substrate film on the metal surface which improves adhesion between the substrate film and the topcoat. The substrate film of this invention refers to the film formed on the metal surface which comprises the aforesaid inorganic film connected by the acrylic resin. In addition, the aforesaid acrylic resin is almost uniformly distributed on the substrate film surface, so frictional resistance is reduced and slip properties are improved.

Preferably, the amino group or the ammonium group in the acrylic resin-containing metal surface treatment composition according to this invention comprises at least the structural unit represented by the following chemical formulae (I) or (II).

(I)

where $R_1$, $R_2$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms

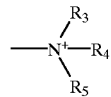

(II)

where $R_3$, $R_4$, $R_5$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms.

Moreover, the molecular weight of the acrylic resin in this invention is 500–100,000, and preferably 1,000–20,000. When the molecular weight is less than 500, corrosion resistance decreases. On the other hand, when the molecular weight exceeds 100,000, hydrophilic properties decrease.

According to this invention, the acrylic resin content is 0.01–10 g/l and preferably 0.1–5 g/l relative to the metal surface treatment composition. When the acrylic resin content is less than 0.1 g/l, a binder effect is not manifested, and the physical durability of the substrate film decreases. On the other hand, when the acrylic resin content exceeds 10 g/l, the adhesion between the substrate film and the metal surface decreases.

In the acrylic resin-containing metal surface treatment composition according to this invention, the acrylic resin contains 1–10 amino and/or ammonium groups, 1–10 hydroxyl groups and 1–5 hydrophobic groups per 1000 molecular weight units of acrylic resin. When there is less than one amino or ammonium group per 1000 molecular weight units of acrylic resin, hydrophilic properties and adhesion to the metal decrease. On the other hand, when there are more than 10 amino or ammonium groups per 1000 molecular weight units of acrylic resin, corrosion resistance decreases.

When there is less than one hydroxyl group per 1000 molecular weight units of acrylic resin, hydrophilic properties and film adhesion decrease. On the other hand, when there are more than 10 hydroxyl groups per 1000 molecular weight units of acrylic resin, corrosion resistance decreases.

When there is less than one hydrophobic group per 1000 molecular weight units of acrylic resin, corrosion resistance and slip properties decrease. On the other hand, when there are more than 5 hydrophobic groups per 1000 molecular weight units of acrylic resin, hydrophilic properties and film adhesion decrease.

In the acrylic resin-containing metal surface treatment composition, the amino group or ammonium group contained in the acrylic resin is introduced by copolymerization of a monomer comprising at least the structural unit represented by the following chemical formulae (III) or (IV):

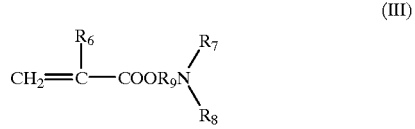

(III)

where $R_6$ is hydrogen or methyl, $R_7$, $R_8$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, and $R_9$ is an alkylene group comprising 1–5 carbon atoms.

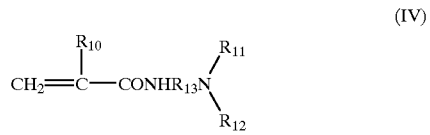

(IV)

where $R_{10}$ are hydrogen or methyl, $R_{11}$, $R_{12}$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, and $R_{13}$ is an alkylene group comprising 1–5 carbon atoms.

In the acrylic resin-containing metal surface treatment composition according to this invention, the hydroxyl group contained in the acrylic resin is introduced by copolymerization of a monomer comprising at least the structural unit represented by the following chemical formula (V):

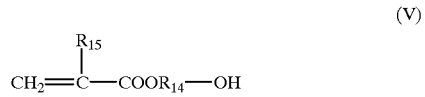

(V)

where $R_{14}$ is an alkylene group comprising 1–4 carbon atoms, and $R_{15}$ is hydrogen or methyl.

Moreover, in the acrylic resin-containing metal surface treatment composition according to this invention, the hydrophobic group contained in the acrylic resin is introduced by copolymerization of a monomer comprising at least the structural unit represented by the following chemical formula (VI):

(VI)

where $R_{16}$ is a straight chain, branched or cyclic alkyl group comprising 4–18 carbon atoms, and $R_{17}$ is hydrogen or methyl.

In the acrylic resin of the acrylic resin-containing metal surface treatment composition of this invention, copolymers of the following monomers are suitable.

(1) The acrylic monomer containing an amino group (ammonium group) may for example be N,N-dimethylaminoethyl(meth)acrylate, N,N-diethylaminoethyl(meth)acrylate, (meth)acrylamide, N,N-dimethylacrylamide, N-methylolacrylamide, N-methylaminopropyl(meth)acrylamide, N,N-dimethylaminopropyl(meth)acrylamide, N-ethylamino propyl(meth)acrylamide, N,N-diethylaminopropyl(meth) acrylamide, or chlorides of these compounds.

(2) The acrylic monomer containing a hydroxyl group may for example be 2-hydroxyethyl(meth)acrylate, hydroxypropyl(meth)acrylate, 4-hydroxybutyl (meth) acrylate, or 2,3-dihydroxypropyl(meth)acrylate.

(3) The monomer containing a hydrophobic group may for example be n-butyl(meth)acrylate, i-butyl (meth)acrylate, t-butyl(meth)acrylate, n-hexyl (meth)acrylate, 2-ethylhexyl(meth)acrylate, lauryl (meth)acrylate, stearyl (meth)acrylate, cyclohexyl (meth)acrylate, isobornyl (meth)acrylate, styrene, p-t-butylstyrene, vinyltoluene, vinylphenol or benzyl (meth)acrylate.

(4) Additionally, other monomers may be added such as acrylic acid, methacrylic acid, maleic acid, itaconic acid or acrylonitrile.

The copolymerization ratios of copolymers formed from the aforesaid monomers are amino group (ammonium group)-containing acrylic monomer 5–60 weight %, hydroxyl group-containing acrylic monomer 20–80 weight %, hydrophobic group-containing monomer 5–50 weight %, and other monomers 0–30 weight %. More preferably, these ratios are amino group (ammonium group)-containing acrylic monomer 20–40 weight %, hydroxyl group-containing acrylic monomer 30–60 weight % and hydrophobic group-containing monomer 20–40 weight %.

When the copolymerization ratio of the amino group (ammonium group)-containing acrylic monomer in the aforesaid copolymer is less than 5 weight %, hydrophilic properties decrease, and the connectivity of the acrylic resin and inorganic film comprising the heavy metal or salt decreases. On the other hand, when the copolymerization ratio of the amino group (ammonium group)-containing acrylic monomer in the aforesaid copolymer exceeds 60 weight %, corrosion resistance decreases.

When the copolymerization ratio of the hydroxyl group-containing acrylic monomer in the aforesaid copolymer is less than 20 weight %, hydrophilic properties and film adhesion decrease. On the other hand, when the copolymerization ratio of the hydroxyl-group-containing acrylic monomer in the aforesaid copolymer exceeds 80 weight %, corrosion resistance decreases.

When the copolymerization ratio of the hydrophobic group-containing monomer in the aforesaid copolymer is less than 5 weight %, slip properties and corrosion resistance decrease. On the other hand, when the copolymerization ratio of the hydrophobic group-containing monomer in the aforesaid copolymer exceeds 50 weight %, hydrophilic properties and film adhesion decrease.

Heavy Metals

In the acrylic resin-containing metal surface treatment composition according to this invention, the heavy metal is at least one of the metals zirconium (Zr), molybdenum (Mo), tungsten (W), niobium (Nb), nickel (Ni), cobalt (Co), manganese (Mn) and tantalum (Ta).

The source of the aforesaid heavy metal is preferably a complex fluoride of the heavy metal, other examples being a nitrate or phosphate.

The content of the complex fluoride of the heavy metal is preferably 0.01–10 g/l relative to the acrylic resin-containing metal surface treatment composition of this invention. When the content of the complex fluoride of the heavy metal is less than 0.01–10 g/l corrosion resistance decreases. On the other hand, when the content of the complex fluoride of the heavy metal exceeds 10 g/l, corrosion resistance again decreases.

The acrylic resin-containing metal surface treatment composition according to this invention may also contain a phosphoric acid or phosphate.

Examples of the phosphoric acid or phosphate are $H_3PO_4$, $Na_3PO_4$, $Na_2HPO_4$, $NaH_2PO_4$ and $(NH_4)_3PO_4$.

The content of the phosphoric acid or phosphate is 0.01–20 g/l, but preferably 0.05–0.1 g/l, relative to the aforesaid acrylic resin-containing metal surface treatment composition. When the phosphoric acid or phosphate content is less than 0.01 g/l, corrosion resistance decreases. When the phosphoric acid or phosphate content exceeds 20 g/l, film adhesion decreases.

The acrylic resin-containing metal surface treatment composition according to this invention may also contain the following etchants and etching assistants optionally.

Etchants

As etchant, hydrogen fluoride or one of its salts may be used. The etchant content may be 0.005–0.5 g/l relative to the metal surface treatment composition. When the etchant content is less than 0.005 g/l, etching is insufficient, and the substrate film is not sufficiently formed on the metal surface. On the other hand, when the etching content exceeds 0.5 g/l, etching is excessive.

Etching Assistants

As etching assistants, hydrogen peroxide ($H_2O_2$), nitrous acid ($HNO_2$), $HBF_4$ or one of its salts may be used. The etching assistant content may be 0.005–5 g/l of hydrogen peroxide ($H_2O_2$), nitrous acid ($HNO_2$) or nitrous acid salt relative to the metal surface treatment composition. When this content is less than 0.005 g/l, corrosion resistance decreases. On the other hand, even if the content exceeds 5 g/l, corrosion resistance decreases. Moreover, it is preferable that the content of $HBF_4$ or its salt is 0.003–0.2 g/l relative to the metal surface treatment composition. When this content is less than 0.003 g/l, corrosion resistance decreases. On the other hand, even if the content exceeds 0.2 g/l, corrosion resistance decreases.

Operating Conditions and Treatment Method

In the metal surface treatment method according to this invention, the aforesaid acrylic resin-containing metal surface treatment composition is brought in contact with a metal surface, and the surface is then rinsed in water and dried.

The pH of the aforesaid metal surface treatment composition is approximately 2.0–5.0, but preferably 2.5–3.5. The adjustment of pH is performed by NaOH, aqueous ammonia or nitric acid. The contact temperature of the metal surface treatment composition and metal material of this invention is normal temperature (e.g. 20° C.)–90° C., and preferably 35–65° C. In general, the contact time of metal material and the acrylic resin-containing metal surface treatment composition according to this invention is shorter the higher the contact temperature.

When the composition of this invention is sprayed on the metal material, it is usual to make contact for approximately 5 seconds–5 minutes, but preferably for 10–60 seconds. When the dipping method is used, a longer contact time than the aforesaid contact time is required. Additionally, contact can be made by the flow coat method and the roll coat method.

The metal material to which the surface treatment is given as aforesaid is rinsed in water, and enters a drying step. The drying temperature is 150–240° C., and at less than 150° C., corrosion resistance decreases.

In the aforesaid rinsing step, after the metal material and the composition of this invention are brought in contact, the surface-treated metal material is rinsed with water to remove composition which did not become a a chemical conversion coating. According to this invention, an inorganic-organic chemical coating is obtained in a one step process.

The surface-treated metal material according to this invention is characterized by the fact that it is surface-treated using the aforesaid acrylic resin-containing metal surface treatment composition.

PREFERRED EMBODIMENTS OF THE INVENTION

Next, this invention will be described in more detail referring to the examples and comparative examples.

Examples 1–11 and Comparative Examples 1–3

(1) Object to be Treated

Molded can obtained by DI processing of an Al—Mn (JIS-A3004) aluminum alloy plate.

(2) Surface Treatment Film Evaluation Method a) Tolerance to Blackening on Contact with Boiling Water Blackening on contact with boiling water refers to blackening which occurs in food cans (aluminum cans) when uncoated parts of the material react with metals present in water upon treatment with boiling tap water for sterilization purposes.

The external appearance of a metal material which had been surface-treated with a composition according to these examples or the comparative examples and immersed in boiling tap water for 30 minutes, was evaluated according to the following criteria.

◯: No change in external appearance

Δ: Slight blackening

×: Blackening b) Slip Properties of Surface Treatment Film

The coefficient of dynamic friction of a metal material which had been surface-treated by the method of this invention was found by a "HEIDON-14" apparatus using 5 mm dia. steel balls, load 50 g and stylus speed 300 mm/min.

◯: less than 0.6

Δ: 0.6–0.8

×: higher than 0.8 c) Topcoat Film Adhesion

BASF paint (EB-70-001N, 150 mg/m$^2$/EB-69-002N, 60 mg/m$^2$) was applied to a treated metal material using a bar coater.

This painted metal material was subjected to wedge bending, and a paint peeling test was performed on the bent part by tape peeling using Nichiban Sellotape, according to the following criteria.

○: Tape peeling width less than 15 mm

Δ: Tape peeling width 15–20 mm

×: Tape peeling width exceeds 20 mm.

(3) Metal Surface Treatment Conditions

EXAMPLE 1

After degreasing an Al—Mn (JIS-A3004) molded can at 75° C. for 60 seconds using an acid degreaser ("Surf Cleaner NHC250", Nippon Paint Co., Ltd.) at 30 g/l concentration under spray conditions, the can was rinsed in water. Next, the water-soluble acrylic resin shown in Table 1 was dissolved at a concentration of 0.5 g/l in a solution obtained by diluting zirconium phosphate ("ALSURF 440", Nippon Paint Co., Ltd.) to 20 g/l, thereby obtaining the metal surface treatment composition of this invention. Spray treatment was carried out using this composition at 50° C. 20 seconds. The treated surface was rinsed in tap water, and heat-dried at 190° C. for 2 minutes.

The evaluation results are shown in Table 3.

Examples 2–11 and Comparative Examples 1–3

In Examples 2–11 and Comparative Examples 1–3, a surface treatment was applied as described in the aforementioned Example 1, using metal surface treatment compositions prepared by blending the water-soluble acrylic resins shown in Table 1 with a complex fluoride of a heavy metal in the blending ratios shown in Table 2. The evaluation results are shown in Table 3.

TABLE 1

| | Water-soluble acrylic resin | | |
|---|---|---|---|
| Type of copolymer | Ratio of copolymerized monomers (by weght) | Molecular weight (Mn) | |
| A-1 | HEMA/DMAEMA/NBA | 50/20/30 | 8000 |
| A-2 | HEA/DMAPAA/EHA | 40/30/30 | 4000 |
| A-3 | HBA/DAMAEA/CHMA | 60/20/20 | 6000 |
| A-4 | HEA/DMAPMA/LMA/SMA | 40/30/20/10 | 3000 |
| A-5 | HEMA/DMAPAA/LMA | 60/20/20 | 3000 |
| A-6 | HEMA/DMAPAA/LMA | 40/30/30 | 3000 |
| A-7 | HEA/DMAEMA/TBMA | 50/30/20 | 10000 |
| B-1 | HEA/NBA | 80/20 | 8000 |
| B-2 | HEMA/DMAPMA | 80/20 | 4000 |

Note:
HEA; 2-hydroxyethyl acrylate
HEMA; 2-hydroxyethyl methacrylate
HBA; 4-hydroxybutyl acrylate
DMAEA; N,N-dimethylaminoethyl acrylate
DMAEMA; N,N-dimethylaminoethyl methacrylate
DMAPAA; N,N-dimethylaminopropyl acrylamide
DMAPMA; N,N-dimethylaminopropyl methacrylamide
NBA; n-butyl acrylate
EHA; 2-ethylhexyl acrylate
CHMA; cyclohexyl methacrylate
LMA; lauryl methacrylate
SMA; stearyl methacrylate
TBMA; t-butyl methacrylate

TABLE 2

| | | Water-soluble acrylic resin | | Heavy metal compound | |
|---|---|---|---|---|---|
| | | Type | Content (g/l) | Type | Content (g/l) |
| Example | 1 | A-1 | 0.5 | ALSURF 440 | 20 |
| | 2 | A-2 | 0.3 | ALSURF 440 | 20 |
| | 3 | A-3 | 1.0 | ALSURF 440 | 20 |
| | 4 | A-4 | 0.5 | ALSURF 440 | 20 |
| | 5 | A-5 | 0.5 | ALSURF 440 | 20 |
| | 6 | A-6 | 0.5 | ALSURF 440 | 20 |
| | 7 | A-7 | 0.5 | ALSURF 440 | 20 |
| | 8 | A-1 | 0.5 | $(NH_4)_2ZrF_8$ | 1 |
| | 9 | A-1 | 0.5 | $(NH_4)_2ZrF_6$ | 1 |
| | 10 | A-1 | 0.1 | ALSURF 440 | 20 |
| | 11 | A-1 | 5.0 | ALSURF 440 | 20 |
| Comparative Example | 1 | B-1 | 0.5 | ALSURF 440 | 20 |
| | 2 | B-2 | 0.5 | ALSURF 440 | 20 |
| | 3 | — | — | ALSURF 440 | 20 |

Note:
ALSURF 440; zirconium phosphate-based treatment, Made by Nippon Paint Inc.

TABLE 3

| | | Result of evaluation | | |
|---|---|---|---|---|
| | | Anti-boiling water-blackening | Slipping properties | Overcoated coating Adherence |
| Example | 1 | ○ | ○ | ○ |
| | 2 | ○ | ○ | ○ |
| | 3 | ○ | ○ | ○ |
| | 4 | ○ | ○ | ○ |
| | 5 | ○ | ○ | ○ |
| | 6 | ○ | ○ | ○ |
| | 7 | ○ | ○ | ○ |
| | 8 | ○ | ○ | ○ |
| | 9 | ○ | ○ | ○ |
| | 10 | ○ | ○ | ○ |
| | 11 | ○ | ○ | ○ |
| Comparative Example | 1 | X | X | X |
| | 2 | ○ | X | Δ |
| | 3 | ○ | X | X |

From the above results, it is clear that tolerance to blackening on contact with boiling water, slip properties and topcoat film adhesion of the metal surface treatment composition of this invention are superior than in the case of a prior art composition.

INDUSTRIAL APPLICATION

According to the metal surface treatment composition of this invention, permeability is suppressed by an inorganic film comprising a heavy metal or one of its salts, so corrosion resistance improves.

The group (ammonium group) in the acrylic resin is coordinated with the (heavy) metal, and the aforesaid inorganic film is connected via the acrylic resin. Consequently, cohesive failure of the inorganic film is prevented, and an almost uniform substrate film is formed on the metal surface. This leads to improved adhesion between the substrate film and the topcoat. Herein, the substrate film refers to a film comprising the aforesaid inorganic film which is connected via the acrylic resin formed on the metal surface. Further, as the aforesaid acrylic resin is almost uniformly distributed on the surface of the substrate film, frictional resistance is lowered, and slip properties are improved.

Therefore, according to the metal surface treatment composition of this invention, corrosion resistance and film adhesion are remarkably improved compared with the prior art, and slip properties are also conferred.

Moreover, according to the metal surface treatment composition of this invention, when food cans are manufactured using aluminum or its alloys, jamming is prevented, and lubricity is conferred on coil coatings.

The metal surface treatment composition of this invention can be used for treating a variety of metal surfaces such as food cans, car bodies, coil coatings for steel plates and construction materials.

What is claimed is:

1. An acrylic resin-containing metal surface treatment composition that confers lubricity on metal surfaces comprising:

(1) a water-soluble, water-dispersable or emulsifiable acrylic resin comprising (1a) an amino group, an ammonium group, or both; (1b) a hydroxyl group; and (1c) at least one hydrophobic group, introduced by copolymerization of a monomer having the structure shown by the following chemical formula (VI):

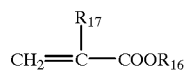

(VI)

where $R_{16}$ is a straight, branched or cyclic group having from 4–20 carbon atoms, and $R_{17}$ is hydrogen or methyl, and (2) a heavy metal or one of its salts;

wherein said acrylic resin comprises 1–10 of at least one group selected from amino and ammonium, 1–10 of hydroxyl groups and 1–5 of hydrophobic groups per 1000 units of its molecular weight; and wherein the copolymerization ratios of the monomers of the acrylic resin copolymer comprising said acrylic resin are from 5–60 weight percent of amino or ammonium group-containing acrylic monomer, from 20–80 weight percent of hydroxyl group-containing acrylic monomer, from 5–50 weight percent hydrophobic group-containing acrylic monomer, and from 0–30 weight percent of at least a monomer selected from acrylic acid, methacrylic acid, maleic acid, itaconic acid and acrylonitrile.

2. An acrylic resin-containing metal surface treatment composition as defined in claim 1, wherein said amino group or ammonium group in said acrylic resin comprises at least the structural unit represented by the following chemical formula (I) or (II):

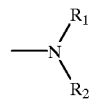

(I)

where $R_1$, $R_2$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms,

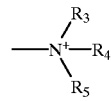

(II)

where $R_3$, $R_4$, $R_5$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms.

3. An acrylic resin-containing metal surface treatment composition as defined in claim 1, wherein the number average molecular weight of acrylic resin is 500–100,000.

4. An acrylic resin-containing metal surface treatment composition as defined in claim 1, wherein the acrylic resin is present in said surface metal treatment composition at a concentration of 0.01–10 g/l of a solvent.

5. An acrylic resin-containing metal surface treatment composition as defined in claim 1, wherein the acrylic resin content is present in said metal surface treatment composition at a concentration of 0.1–5 g/l of a solvent.

6. An acrylic resin-containing metal surface treatment composition as defined in claim 1, wherein said amino group or ammonium group in said acrylic resin is introduced by copolymerization of a monomer having at least the structure shown by the following chemical formulae (III) or (IV):

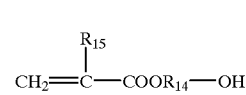

(V)

where $R_6$ is hydrogen or methyl, $R_7$, $R_8$ are hydrogen, hydroxyl, a substituted or unsubstituted straight chain or branched alkyl group comprising 1–5 carbon atoms, or a substituted or unsubstituted straight chain or branched hydroxyalkyl group comprising 1–5 carbon atoms, and $R_9$ is alkylene group comprising 1–5 carbon atoms:

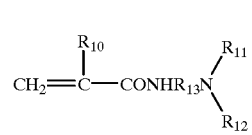

(IV)

where $R_{10}$ is hydrogen or methyl, $R_{11}$, $R_{12}$ are hydrogen, hydroxyl, a substitued or unsubstituted straight chain or branched alkyl group comprising 1–5 carbon atoms, or a substituted or unsubstituted straight chain or branched hydroxyalkyl group comprising 1–5 carbon atoms, and $R_{13}$ is alkylene group comprising 1–5 carbon atoms.

7. An acrylic resin-containing metal surface treatment composition as defined in claim 1, wherein at least one of the hydroxyl groups in said acrylic resin is introduced by copolymerization of a monomer having the structure shown by the following chemical formula (V)

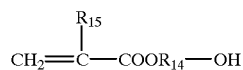

(V)

where $R_{14}$ is an alkylene group comprising 1–4 carbon atoms, and $R_{15}$ is hydrogen or methyl.

8. An acrylic resin-containing metal surface treatment composition as defined in claim 1,
wherein the copolymerization ratios of the monomers of the acrylic resin copolymer comprising said acrylic resin are from 20–40 parts by weight of amino or ammonium group-containing acrylic monomer, from 30–60 parts by weight of hydroxyl group-containing acrylic monomer and from 20–40 parts by weight of hydrophobic group-containing acrylic monomer.

9. An acrylic resin-containing metal surface treatment composition as defined in claim 1, wherein said heavy metal is at least one metal selected from zirconium, molybdenum, tungsten, niobium, nickel, cobalt, manganese and tantalum.

10. An acrylic resin-containing metal surface treatment composition as defined in claim 9,
wherein the source of said heavy metal is at least one of a complex fluoride, nitrate, or phosphate of said heavy metal.

11. An acrylic resin-containing metal surface treatment composition as defined in claim 9,
wherein the heavy metal is a heavy metal complex fluoride present in said metal surface treatment composition at a concentration of 0.01–10 g/l of a solvent.

12. An acrylic resin-containing metal surface treatment composition as defined in claim 1, wherein the heavy metal is at least one metal selected from zirconium, niobium, manganese and tantalum.

13. An acrylic resin-containing metal surface treatment composition as defined in claim 1, further comprising phosphoric acid, a phosphate, or both.

14. An acrylic resin-containing metal surface treatment composition as defined in claim 13,
wherein said phosphate is $Na_3PO_4$, $Na_2HPO_4$, $NaH_2PO_4$ or $(NH_4)_3PO_4$.

15. An acrylic resin-containing metal surface treatment composition as defined in claim 13,
wherein the phosphoric acid or phosphate content is 0.01–20 g/l of a solvent.

16. An acrylic resin-containing metal surface treatment composition as defined in claim 1, further comprising an etchant.

17. An acrylic resin-containing metal surface treatment composition as defined in claim 16, wherein said etchant is hydrogen fluoride, one of its salts, or both.

18. An acrylic resin-containing metal surface treatment composition as defined in claim 16,
wherein the etchant content is 0.005–5 g/l relative to the metal surface treatment composition.

19. An acrylic resin-containing metal surface treatment composition as defined in claim 1, further containing an etching assistant.

20. An acrylic resin-containing metal surface treatment composition as defined in claim 19, wherein said etching assistant is at least one of hydrogen peroxide, nitrous acid, nitrous acid salt, $HBF_4$, or a boron fluoride salt.

21. An acrylic resin-containing metal surface treatment composition as defined in claim 20,
wherein the hydrogen peroxide, nitrous acid or nitrous acid salt content is 0.005–5 g/l of a solvent.

22. An acrylic resin-containing metal surface treatment composition as defined in claim 20,
wherein the $HBF_4$ or salt content is 0.003–0.2 g/l of a solvent.

23. A metal surface treatment method, wherein an acrylic resin-containing metal surface treatment composition as defined in claim 1 is brought in contact with a metal surface, the metal surface is rinsed with water, and the metal surface is dried.

24. A surface-treated metal material which has been treated with an acrylic resin-containing metal surface treatment composition as defined in claim 1.

25. An aluminum can having a surface treated by the acrylic resin-containing metal surface treatment composition of claim 1 so as to prevent jamming.

* * * * *